(12) United States Patent
Valsecchi et al.

(10) Patent No.: US 9,550,954 B2
(45) Date of Patent: Jan. 24, 2017

(54) TRIAZINE DERIVATIVE

(75) Inventors: Roberto Valsecchi, Osio Sopra (IT); Fabrizio Mutta, Fin Mornasco (IT); Claudio Adolfo Pietro Tonelli, Monza (IT)

(73) Assignee: SOLVAY SPECIALTY POLYMERS ITALY S.P.A., Bollate (Milan) (IT)

( * ) Notice: Subject to any disclaimer, the term of this patent is extended or adjusted under 35 U.S.C. 154(b) by 305 days.

(21) Appl. No.: 13/989,549

(22) PCT Filed: Nov. 28, 2011

(86) PCT No.: PCT/EP2011/071107
§ 371 (c)(1),
(2), (4) Date: May 24, 2013

(87) PCT Pub. No.: WO2012/072532
PCT Pub. Date: Jun. 7, 2012

(65) Prior Publication Data
US 2013/0237462 A1    Sep. 12, 2013

(30) Foreign Application Priority Data

Dec. 3, 2010 (EP) .................................... 10193692

(51) Int. Cl.
| | | |
|---|---|---|
| *C10M 133/42* | (2006.01) | |
| *C10M 147/04* | (2006.01) | |
| *C08G 65/00* | (2006.01) | |
| *C08G 65/333* | (2006.01) | |

(52) U.S. Cl.
CPC ............ *C10M 133/42* (2013.01); *C08G 65/00* (2013.01); *C08G 65/007* (2013.01); *C08G 65/33317* (2013.01); *C10M 2213/0606* (2013.01); *C10M 2215/2225* (2013.01)

(58) Field of Classification Search
CPC .................. C10M 133/42; C10M 2215/2225; C10M 2213/0606; C08G 65/00; C08G 65/007
USPC .......................................... 508/257; 568/615
See application file for complete search history.

(56) References Cited

U.S. PATENT DOCUMENTS

| | | |
|---|---|---|
| 3,654,273 A | 4/1972 | Schuman et al. |
| 3,976,603 A | 8/1976 | Caporiccio et al. |
| 5,942,598 A | 8/1999 | Iwa et al. |
| 6,156,937 A | 12/2000 | Marchionni et al. |
| 6,528,460 B2 | 3/2003 | Kawata et al. |
| 2007/0060487 A1 | 3/2007 | Burns et al. |
| 2009/0023017 A1 | 1/2009 | Tomiyasu et al. |
| 2009/0203830 A1 * | 8/2009 | Abusleme et al. ........... 524/520 |

FOREIGN PATENT DOCUMENTS

| | | |
|---|---|---|
| CN | 1831032 A | 9/2006 |
| EP | 1033368 A2 | 9/2000 |
| EP | 1712580 A1 * | 10/2006 |
| EP | 1978077 A1 | 10/2008 |
| JP | S50-104299 | 8/1975 |
| JP | 2006-70173 A | 3/2006 |
| WO | WO 9855464 A1 | 12/1998 |
| WO | 03/067285 A2 | 8/2003 |
| WO | WO 03067285 A2 * | 8/2003 |

* cited by examiner

*Primary Examiner* — James Goloboy

(57) ABSTRACT

The invention pertains to certain (per)fluoropolyether triazine derivatives comprising at least one triazine group and at least one fluoropolyoxyalkene chain (chain $R_f$) comprising a fluorocarbon segment having ether linkages in main chain, said chain $R_f$ comprising at least one hydroxyl group, to a method for their manufacture and to their use in lubrication, in particular for lubricating sliding or moving parts of magnetic recording media.

18 Claims, 1 Drawing Sheet

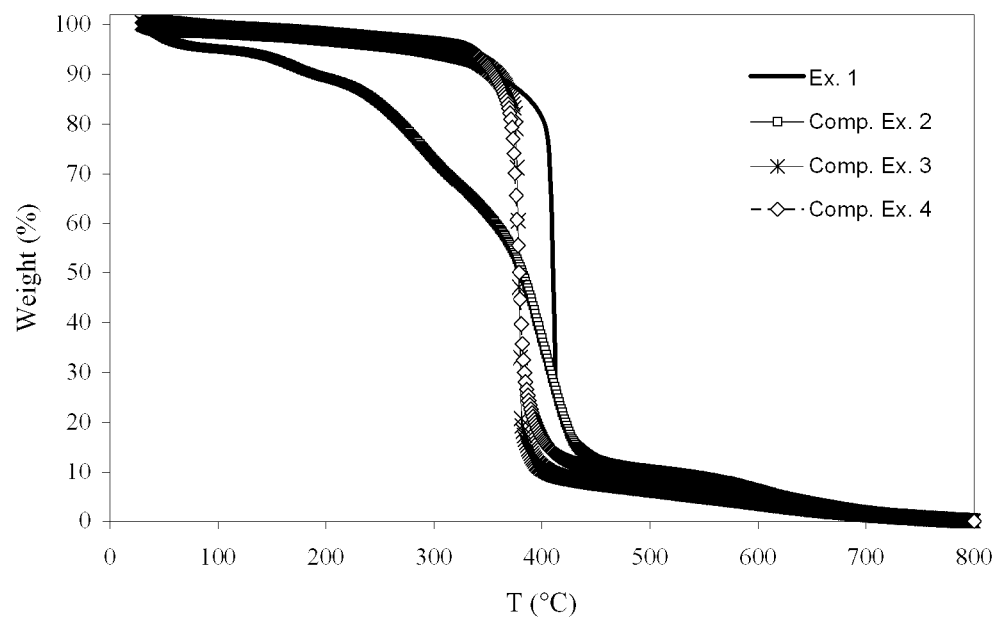

TRIAZINE DERIVATIVE

CROSS-REFERENCE TO RELATED APPLICATIONS

This application is a U.S. national stage entry under 35 U.S.C. §371 of International Application No. PCT/EP2011/071107 filed Nov. 28, 2011, which claims priority to European patent application 10193692.0 filed on Dec. 3, 2010, the whole content of this application being herein incorporated by reference for all purposes.

TECHNICAL FIELD

The invention pertains to certain (per)fluoropolyether triazine derivatives, to a method for their manufacture and to their use in lubrication, in particular for lubricating sliding or moving parts of magnetic recording media.

BACKGROUND ART

As well known, magnetic recording apparatus is divided into those using a magnetic disk as the medium on which to record data and those using magnetic tape as such medium. Because the former type of recording apparatus using a magnetic disk (hereinafter referred to as magnetic disk drives) is prevailing, the following description focuses on magnetic disk drives as an example of the magnetic recording apparatus.

As the capacity enlargement of magnetic disk drives has been pursued for recent years, the fly height of the magnetic head has been lowered rapidly down to below 10 nm or even less, and, consequently, there is increasing need for reliability in terms of resistance to sliding friction.

Also, there is strong need to enhance the data processing speed with more disk capacity. In particular, in a Redundant Array of Independent Disks (RAID) system, a magnetic disk drive that operates at a disk revolving speed of 10,000 rpm or higher is required.

In order to ensure the reliability of a magnetic disk drive, generally, a lubricant layer is formed on a carbon overcoat on the surface of a magnetic disk for use in the disk drive. As the main material of the lubricant layer, usually, fluoropolyether which is a chemically stable fluorinated organic compound is widely used.

Actually, in order to assure reliability of the magnetic disk drive, it is mandatory to efficiently preserve suitable lubricant distribution on the surface of said magnetic disk drive for long operating times. When magnetic disk drives operate, said disk revolve at a high speed and the lubricant might be spun off by the combined action of the air shear due to the air flow on the surface of the disk as the disk revolves, and of the centrifugal force directly exerted on the lubricant. As a consequence, it is often observed that the quantity of the lubricant on the surface of the disk gradually decreases. Also, evaporation phenomena of the lubricant into the atmosphere inside the magnetic drive may take place.

To overcome this problem of the lubricant loss by being spun off during disk revolution and natural evaporation, approaches have heretofore been proposed. Thus, a method for restraining the lubricant from being spun off and evaporated has been proposed in which the adhesion force of the lubricant to the disk protecting layer is made stronger by increasing the polarity of the functional end groups in the lubricant. Said polar end groups are believed to both improve adherence of the lubricant to the surface of the magnetic media and decrease volatility.

Within this approach, fluoropolyether lubricants based on fluoropolyethers having polar functional groups both in the end groups and in the chain have shown best performances.

Thus, JP 2006070173 (FUJITSU LTD) 16 Mar. 2006 discloses a lubricant for magnetic recording media (MRM) having fluorinated polyether structure, said lubricant comprising from 1 to 10 hydroxyl group per molecule and comprising the following structural units bound with each other through an ether bond:

—CF$_2$CH$_2$OH (terminal group)  (1)

—CF$_2$— (inner group)  (2)

—CF$_2$CF$_2$— (inner group)  (3)

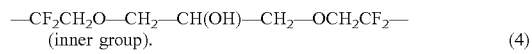

—CF$_2$CH$_2$O—CH$_2$—CH(OH)—CH$_2$—OCH$_2$CF$_2$—
(inner group).  (4)

Similarly, US 2007060487 (HITACHI GLOBAL STORAGE TECH) 15 Mar. 2007 discloses a MRM lubricant with non-terminal functional groups; the location of the functional groups is selected so as to minimize chain length of free backbone PFPE chain between functional groups while simultaneously maximizing evaporation temperature and ensuring efficient bonding to the lubricated surface.

Further, US 2009023017 (HOYA CORP [JP]) 22 Jan. 2009 discloses lubrication of MRM surfaces by means of compounds comprising a central phosphazene ring, said central moiety being substituted with one or more perfluoropolyether chains comprising hydroxyl groups bonded thereto, so as to finally provide a number of hydroxyl group in the compounds exceeding 2.

Further, in addition, for achieving large mass-storage capacity, thanks to the merger of optical and magnetic recording technology, heat assisted magnetic recording disks have captured increasing attention; according to this technique, the magnetic recording disk made of magnetic material having large magnetic anisotropy energy (and thus not 'writable' as such') is locally heated by irradiation so as to locally decrease magnetic coercive force and thus making it possible to record information via a magnetic head. Requirements for a lubricant for magnetic recording media suitable for this technique are thus even more stringent as the lubricated face of the disk is exposed, in addition to the ultra-low-height flying of the head and the extremely rapid revolution speed, to temperatures which can locally reach temperatures of 200° C. or higher. Decomposition and/or evaporation phenomena might be accelerated.

Within this context, traditional perfluoropolyether lubricants as above detailed have been found to undergo significant thermo-oxidative degradation phenomena, making thus them possibly unsuitable for being used in such heat assisted magnetic recording techniques.

On the other side, triazine derivatives comprising fluorinated moieties are known in the art.

For instance, EP 1033368 A (AUSIMONT SPA) 6 Sep. 2000 discloses fluorinated triazinic compounds of either of formulae:

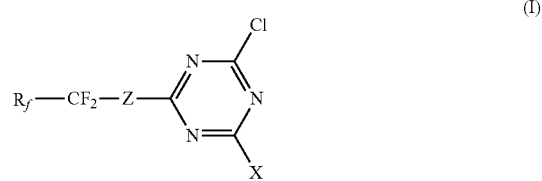

(I)

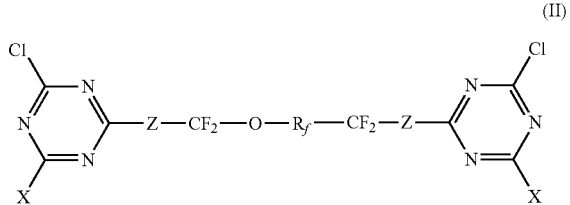
(II)

wherein Z=T-Y, with T=-(CH$_2$)$_q$—, —SO$_2$—, —CO—, q=is an integer from 1 to 20; Y=O—, O(C$_2$H$_4$O)$_p$—, O(CH$_2$)$_n$—NR—, O(CH$_2$)$_n$—O—, O(C$_3$H$_6$O)$_p$—, NR—, S—, S(C$_2$H$_4$O)$_p$—, S(C$_3$H$_6$O)$_p$—; wherein R=H, alkyl from 1 to 10 C atoms; n is an integer from 1 to 20; p is an integer from 1 to 5; R$_f$ represents a linear or branched fluoroalkyl chain or a (per)fluoropolyether chain, X is selected from: Cl; R$_f$—CF$_2$—Z; CF$_3$—Z, which are taught as suitable for the manufacture of formulations for the treatment of natural or synthetic fibres textiles.

EP 1712580 A (SOLVAY SOLEXIS SPA) 18 Oct. 2006 discloses compounds of formula:

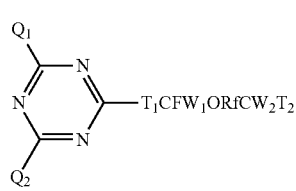
(III)

wherein, inter alia, at least one of Q$_1$ and Q$_2$ is a phenyl ring and T2 is either a group of formula:

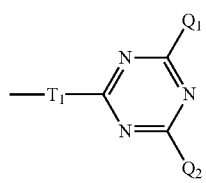
(IV)

in which Q1 and Q2 are as defined above, or a neutral group, possibly halogenated.

U.S. Pat. No. 6,156,937 (AUSIMONT SPA) 5 Dec. 2000 discloses, inter alia, triazine compounds of formula:

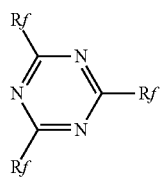
(V)

in which Rf is ClC$_3$F$_6$O(C$_3$F$_6$O)$_{1.27}$(CF$_2$O)$_{0.05}$—CF$_2$O—.

U.S. Pat. No. 5,942,598 (NIPPON MEKTRON LIMITED) 24 Aug. 1999 relates to an oily composition containing about 80 to about 95 parts by weight of a perfluoropolyether having a definite viscosity value and about 20 to about 5 parts by weight of a perfluoroalkylene triazine oligomer in which non functional perfluoropolyether chains are linked to the triazine rings.

Also, EP 1978077 A (FUJIFILM CORP) 8 Oct. 2008 discloses, inter alia, certain triazine derivatives comprising fluorinated chains interrupted by ethereal oxygens, bond to the triazine moiety through a suitable spacer, which can be used, notably, as lubricants e.g. for magnetic material films such as those of diamond-like carbon.

There is thus still a current shortfall in the art for lubricant compounds endowed with improved thermo-oxidative stability, coupled with high cohesion with support layers to be lubricated and outstanding lubricating behaviour, which would satisfy more and more demanding requirements for new MRM technologies, including heat assisted magnetic recording techniques.

SUMMARY OF INVENTION

The Applicant has now found that certain triazine derivatives, as below detailed, can advantageously provide improved lubricating behaviour in the domain of MRM, in particular when coated onto the diamond-like carbon layers of hard disk or other active layers, by ensuring improved thermo-oxidative stability, coupled with high cohesion with support layers to be lubricated.

It is thus a first object of the present invention a triazine derivative comprising at least one triazine group and at least one fluoropolyoxyalkene chain (chain R$_f$) comprising a fluorocarbon segment having ether linkages in main chain, said chain R$_f$ comprising at least one hydroxyl group.

The Applicant has surprisingly found that the simultaneous presence in the inventive triazine derivative of the triazine moiety, of the fluoropolyoxyalkene chain and of the hydroxyl group(s) enables achieving outstanding lubricating behaviour, coupled with thermo-oxidative stability and strong interaction with MRM-type supports, which make these derivatives suitable for being used for lubricating magnetic recording media, including for heat-assisted magnetic recording.

The triazine group(s) of the triazine derivative can be any of 1,2,3-triazine, 1,2,4-triazine and 1,3,5-triazine, this latter being preferred.

It is also generally understood that the chain R$_f$ will be generally bound to any of the carbon atoms of the triazine derivative.

While embodiments wherein only one of said carbon atoms of the triazine ring is covalently bound through a suitable spacer to one chain R$_f$, as above detailed, comprising one or more than one hydroxyl group, it is nevertheless preferred for each of the carbon atoms of the triazine derivatives to be bound through said spacer to a chain R$_f$, as above detailed, comprising one or more than one hydroxyl group.

The fluoropolyoxyalkene chain (R$_f$) of the triazine derivative of the invention is preferably a chain comprising repeating units R°, said repeating units being chosen among the group consisting of:

—CFXO—,  (i)

wherein X is F or CF$_3$,

—CFXCFXO—,  (ii)

wherein X, equal or different at each occurrence, is F or CF$_3$, with the provision that at least one of X is —F, —CF$_2$CF$_2$CW$_2$O—,  (iii)

wherein each of W, equal or different from each other, are F, Cl, H,

  (iv)

  (v)

wherein j is an integer from 0 to 3 and Z is a group of general formula —$OR'_fT_3$, wherein $R'_f$ is a fluoropolyoxyalkene chain comprising a number of repeating units from 0 to 10, said recurring units being chosen among the followings: —CFXO—, —$CF_2$CFXO—, —$CF_2CF_2CF_2$O—, —$CF_2CF_2CF_2$O—, with each of each of X being independently F or $CF_3$. and $T_3$ being a $C_1$-$C_3$ perfluoroalkyl group.

Possibly, in addition, the chain $R_f$ can optionally comprise recurring units derived from moieties comprising at least one hydroxyl group; among recurring units which may be comprised in the $R_f$ chain, mention can be notably made of units of formulae:

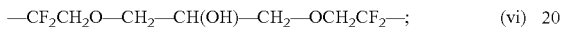  (vi)

  (vii)

  (viii)

According to preferred embodiments, the triazine derivative of the present invention complies with any of formulae (T-1) and (T-2) herein below:

each of $R_F$, $R'_F$, $R''_F$, $R°_F$, $R°'_F$, $R°''_F$, $R°'''_F$, $R°''''_F$, $R''_F$, $R°*_F$, $R°**_F$, equal to or different from each other, is independently a divalent fluoropolyoxyalkene chain ($R_f$) as above detailed;

each of E, E', E'', E°, E°', E°'', E°''', E°'''', E°*, E°, E°*, E°****, equal to or different from each other, is independently a bond or a $C_1$-$C_{20}$ divalent bridging group, optionally comprising heteroatoms, possibly fluorinated, possibly further comprising one or more than one hydroxyl group;

n in formula (T-2) is zero or an integer from 1 to 5; preferably n is zero.

Each of the $R_F$, $R'_F$, $R''_F$, $R°_F$, $R+'_F$, $R°''_F$, $R°'''_F$, $R°''''_F$, $R°*_F$, $R°**_F$ of formulae (T-1) and (T-2) is preferably independently selected from chains of formula:

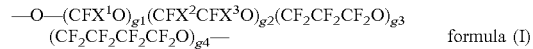  formula (I)

wherein
$X^1$, $X^2$, $X^3$ equal or different from each other and at each occurrence are independently —F, —$CF_3$;
g1, g2, g3, and g4, equal or different from each other, are independently integers ≥0, such that the g1+g2+g3+g4 is in the range from in the range 5 to 10000, preferably between 10 and 5000; should at least two of g1, g2, g3 and g4 be different from zero, the different recurring units are generally statistically distributed along the chain.

(T-1)

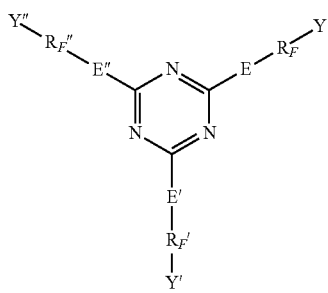

(T-2)

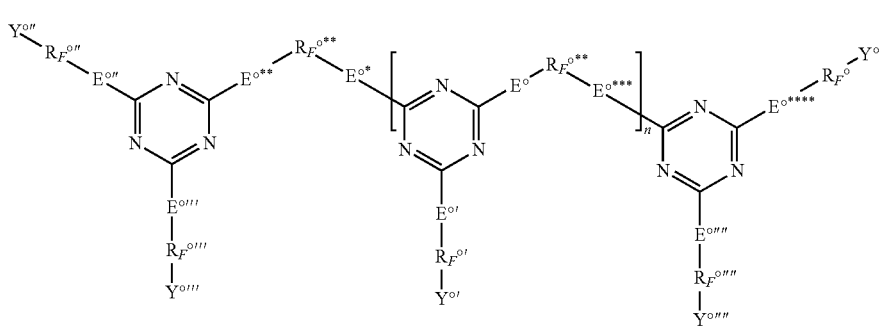

wherein:
each of Y, Y', Y'', Y°, Y°', Y°'', Y°''', Y°'''' equal to or different from each other, is independently a hydrocarbon group, possibly fluorinated, with the provision that at least one of Y, Y', Y'' in formula (T-1) and at least one of Y°, Y°', Y°'', Y°''', Y°'''' in formula (T-2) comprises at least one hydroxyl group; preferably each of Y, Y', Y'', Y°, Y°', Y°'', Y°''', Y°'''' as above detailed comprises at least one hydroxyl group;

Each of the $R_F$, $R'_F$, $R''_F$, $R°_F$, $R°'_F$, $R''_F$, $R°'''_F$, $R°''''_F$, $R°*_F$, $R°**_F$ of formula (T-1) and (T-2) is more preferably independently selected from chains of formula:

(A) 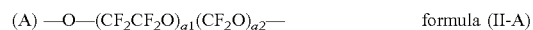  formula (II-A)

wherein
a1 and a2 are independently integers ≥0 such that the number average molecular weight is between 400 and 150,000, preferably between 500 and 80 000; both a1 and a2 are preferably different from zero, with the ratio a1/a2 being preferably comprised between 0.1 and 10.

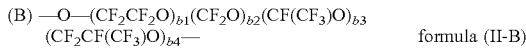

(B) —O—(CF$_2$CF$_2$O)$_{b1}$(CF$_2$O)$_{b2}$(CF(CF$_3$)O)$_{b3}$(CF$_2$CF(CF$_3$)O)$_{b4}$—      formula (II-B)

wherein:
b1, b2, b3, b4, are independently integers ≥0 such that the number average molecular weight is between 500 and 150 000, preferably between 500 and 80 000; preferably b1, b2, b3, b4 are all >0, with the ratio b4/(b1+b2+b3) being <1.

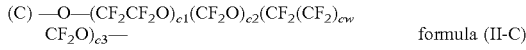

(C) —O—(CF$_2$CF$_2$O)$_{c1}$(CF$_2$O)$_{c2}$(CF$_2$(CF$_2$)$_{cw}$CF$_2$O)$_{c3}$—      formula (II-C)

wherein:
cw=1 or 2;
c1, c2, and c3 are integers 0 chosen so that the number average molecular weight is between 500 and 150,000; preferably c1, c2 and c3 are all >0, with the ratio c3/(c1+c2) being generally lower than 0.05.

(D) —O—(CF$_2$CF(CF$_3$)O)$_d$—      formula (II-D)

wherein:
d is an integer >0 such that the number average molecular weight is between 500 and 150,000;

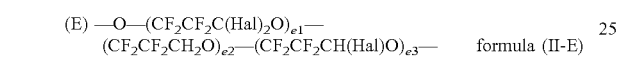

(E) —O—(CF$_2$CF$_2$C(Hal)$_2$O)$_{e1}$—(CF$_2$CF$_2$CH$_2$O)$_{e2}$—(CF$_2$CF$_2$CH(Hal)O)$_{e3}$—      formula (II-E)

wherein:
Hal, equal or different at each occurrence, is a halogen selected from fluorine and chlorine atoms, preferably a fluorine atom;
e1, e2, and e3, equal to or different from each other, are independently integers ≥0 such that the (e1+e2+e3) sum is comprised between 5 and 10000.

Each of the R$_F$, R'$_F$, R''$_F$, R°$_F$, R°'$_F$, R''$_F$, R°'''$_F$, R°''''$_F$, R''$_F$, R°**$_F$ of formulae (T-1) and (T-2) is most preferably independently selected from chains of formula (III) here below:

—O—(CF$_2$CF$_2$O)$_{a1}$(CF$_2$O)$_{a2}$—      formula (III)

wherein:
a1, and a2 are integers >0 such that the number average molecular weight is between 400 and 150,000, preferably between 500 and 80,000, with the ratio a2/a1 being generally comprised between 0.1 and 10, more preferably between 0.2 and 5.

As above mentioned, at least one of Y, Y', Y" in formula (T-1) and at least one of Y°, Y°', Y°", Y°''', Y°'''' in formula (T-2) comprises a hydroxyl group; the selection of said hydroxyl-containing group is not particularly critical.

At least one of Y, Y', Y" in formula (T-1) and at least one of Y°, Y°', Y°", Y°''', Y°'''' in formula (T-2) is preferably selected from the group consisting of:
groups of formulae —CF$_2$CH$_2$—O—(CH$_2$CH$_2$O)$_{s'}$H and —CF$_2$CF$_2$CH$_2$O(CH$_2$CH$_2$O)$_{s''}$H, wherein s' and s", equal or different each other and at each occurrence, are integers from 0 to 5; and
groups of formulae —CF$_2$CH$_2$O(CH$_2$CH$_2$O)$_{w'}$J'(OH)$_{e'}$ and —CF$_2$CF$_2$CH$_2$O(CH$_2$CH$_2$O)$_{w''}$J"(OH)$_{e''}$, wherein w' and w", equal or different each other and at each occurrence, are integers from 0 to 5, J' and J" are C$_1$÷C$_{12}$ hydrocarbon bridging group, optionally notably comprising ethereal bonds; e' and e" are integers from 2 to 4.

Among structures of formulae —CF$_2$CH$_2$O(CH$_2$CH$_2$O)$_{w'}$J'(OH)$_{e'}$ and —CF$_2$CF$_2$CH$_2$O(CH$_2$CH$_2$O)$_{w''}$J"(OH)$_{e''}$ as above detailed, mention can be notably made of mugs of formulae (NG-1) and (NG-2):

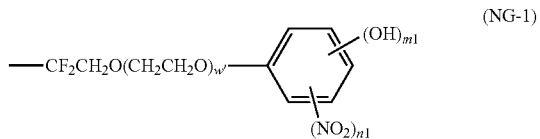

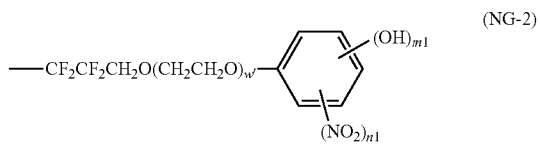

wherein w', equal or different each other and at each occurrence, is an integer from 0 to 5, m1 is an integer from 1 to 3 and n1 is an integer from 0 to 2.

It is further understood that in embodiments wherein at least one of Y, Y', Y" in formula (T-1) and at least one of Y°, Y°', Y°", Y°''', Y°'''' in formula (T-2) comply with formulae (NG-1) or (NG-2) as detailed herein above, those other end groups which do not comply with said formulae, i.e. which do not comprise a hydroxyl group, generally comply with the followings:

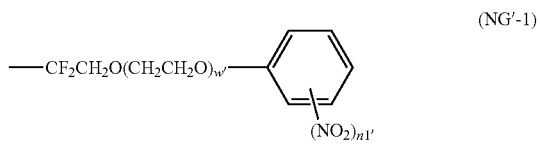

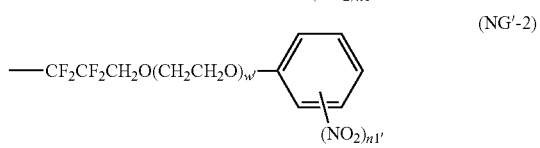

wherein n1' is an integer from 0 to 3.

At least one of Y, Y', Y" in formula (T-1) and at least one of Y°, Y°', Y°", Y°''', Y°'''' in formula (T-2) is more preferably selected from the group consisting of:
groups of formulae —CF$_2$CH$_2$OH and —CF$_2$CF$_2$CH$_2$OH; and
groups of formulae —CF$_2$CH$_2$—O—(CH$_2$CHOHCH$_2$O)$_{d'}$H and —CF$_2$CF$_2$CH$_2$O(CH$_2$CHOHCH$_2$O)$_{d''}$H, wherein d' and d", equal or different each other and at each occurrence, are integers from 1 to 3.

Each of the divalent bridging groups E, E', E", E°, E°', E°", E°''', E°*, E°** of formulae (T-1) and (T-2) can comprise a C$_1$-C$_{20}$ alkylene chain, a (alkylene)cycloaliphatic C$_1$-C$_{20}$ group, an (alkylen)aromatic C$_1$-C$_{20}$ group, a C$_1$-C$_{20}$ polyalkylenoxy group. Further, in addition, linkage to the triazine carbon atom can be provided by said bridging group via a carbon-carbon bond, or via suitable functional group, including, notably amine, amide, ester, ether, sulfide, imine group.

According to an embodiment of the invention, each of the divalent bridging groups E, E', E", E°, E°', E°", E°''', E°'''', E°*, E°, E°*, E°**** in formulae (T-1) and (T-2) is independently selected from the group consisting of:
groups of formula —CF$_2$CH$_2$—O—(CH$_2$CH$_2$O)$_{z'}$— and of formula —CF$_2$CF$_2$CH$_2$—O—(CH$_2$CH$_2$O)$_{z''}$—, wherein z' and z", equal to or different each other, are integers from 0 to 5, being understood that the oxygen atom will be generally bound to the carbon atom of the triazine ring and the —CF$_2$— group to the fluoropolyoxyalkene chain;

and groups of formula —$CF_2CH_2$—O—$(CH_2CH_2O)_{r'}$—$(CH_2CHOHCH_2O)_{t'}$— and —$CF_2CF_2CH_2$—O—$(CH_2CH_2O)_{r''}$—$(CH_2CHOHCH_2O)_{t''}$—, wherein r', r'', t' and t'', equal to or different each other and at each occurrence, are independently integers from 0 to 5, being understood that the oxygen atom will be generally bound to the carbon atom of the triazine ring and the —$CF_2$— group to the fluoropolyoxyalkene chain.

The triazine derivatives according to this embodiment preferably comply with formulae (T-1a) and (T-2a) herein below:

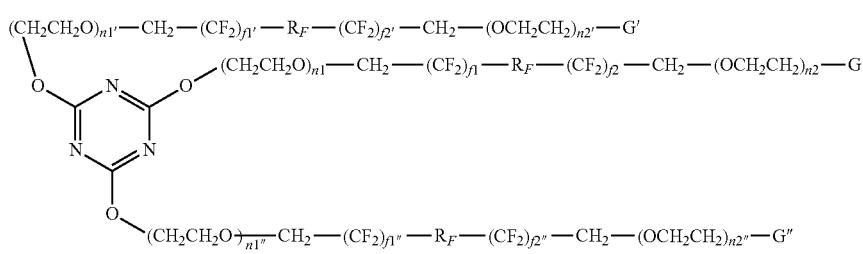
(T-1a)

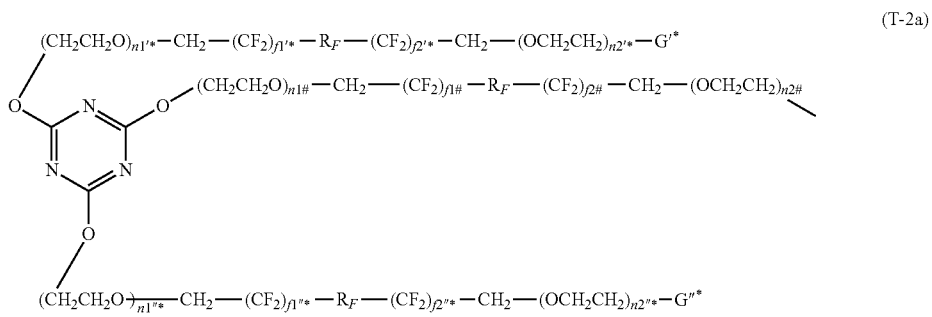
(T-2a)

wherein:
- each of n1, n2, n1', n2', n1'', n2'', n1#, n2#, n1*, n2*, n1'*, n2'*, n1''*, n2''*, n1'''*, n2'''*, equal to or different from each other, is independently an integer from 0 to 5, preferably 0;
- each of f1, f2, f1', f2', f1'', f2'', f1*, f2*, f1'*, f2'*, f1''*, f2''*, f1'''*, f2'''*, f1#, f2#, equal to or different from each other, is independently an integer of 1 to 2;
- each of $R_F$, equal to or different from each other and at each occurrence, is independently a divalent fluoropolyoxyalkene chain ($R_f$) as above detailed;
- each of G, G', G'', G*, G'*, G''*, G'''*, equal to or different from each other, is independently a hydroxyl-containing group, preferably selected from the group consisting of formulae (g1), (g2) and (g3) herein below:

—OH
(g1)

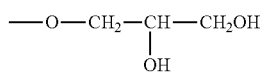
(g2)

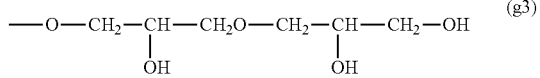
(g3)

preferably a hydroxyl-containing group of formula (g1).

According to another embodiment of the invention, each of the divalent bridging groups E, E', E'', E°, E°', E°'', E°''', E°'''', E°*, E°, E°*, E°**** in formulae (T-1) and (T-2) is independently selected from the group consisting of groups of formula —$CF_2C(O)$—$NR_H$—, wherein $R_H$ is a hydrogen atom, a $C_1$-$C_6$ hydrocarbon group or, preferably a group of formula (chain $R_f$)—C(O)—, in which chain $R_f$ is a fluoropolyoxyalkylene chain as defined above, said chain $R_f$ containing at least one hydroxyl group. It is to be understood that the nitrogen atom in the —$CF_2C(O)$—$NR_H$— group will be generally bound to the carbon atom of the triazine ring and the —$CF_2$— group to the fluoropolyoxyalkene chain.

The triazine derivatives according to this second embodiment preferably comply with formulae (T-1b) and (T-2b) herein below:

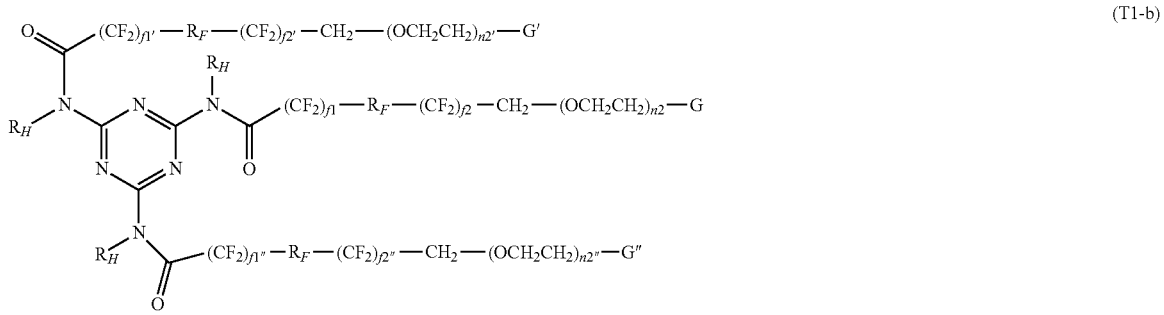
(T1-b)

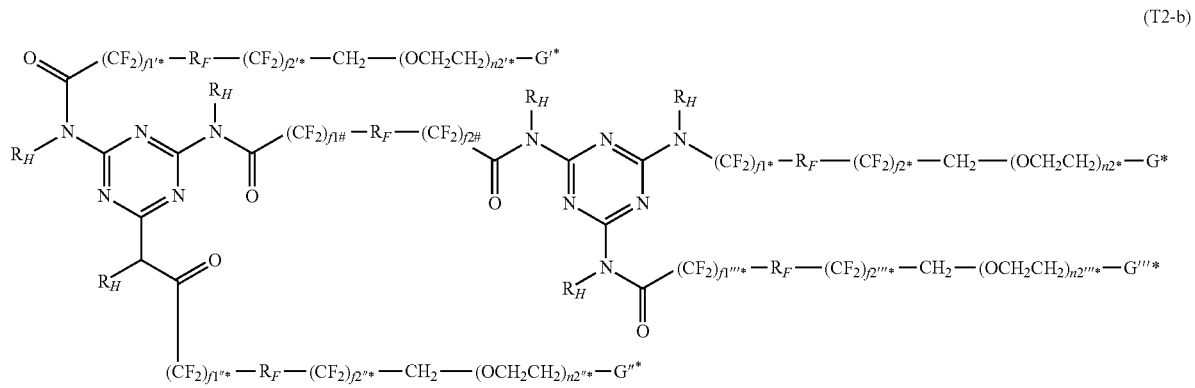
(T2-b)

wherein:
each of n2, n2', n2", n2#, n2*, n2'*, n2"*, n2'"*, equal to or different from each other, is independently an integer from 0 to 5, preferably 0;
each of f1, f2, f1', f2', f1", f2", f1*, f2*, f1'*, f2'*, f1"*, f2"*, f1'"*, f2'"*, f1#, f2#, equal to or different from each other, is independently an integer of 1 to 2;
each of $R_F$, equal to or different from each other and at each occurrence, is independently a divalent fluoropolyoxyalkene chain ($R_f$) as above detailed;
each of $R_H$, equal to or different from each other and at each occurrence, is independently a hydrogen atom, a $C_1$-$C_6$ alkyl group or, preferably, a group of formula (chain $R_f$)—C(O)—, in which $R_f$ is a fluoropolyoxyalkylene chain as defined above, said chain $R_f$ containing at least one hydroxyl group;
each of G, G', G", G*, G'*, G"*, G'"*, equal to or different from each other, is independently a hydroxyl-containing group, preferably selected from the group consisting of formulae (g1), (g2) and (g3) herein below:

(g1)

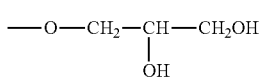
(g2)

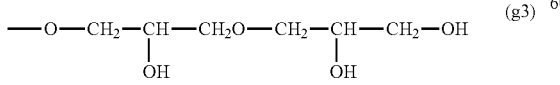
(g3)

preferably a hydroxyl-containing group of formula (g1).
Where in the above triazines (T-1b) and (T-2b) one or more $R_H$ is a group of formula (chain $R_f$)—C(O)—, said group preferably complies with formula —C(O)—$(CF_2)_{f1}{}^a$—$R_F{}^a$—$(CF_2)_{f2}{}^a$—$CH_2$—$(OCH_2CH_2)_{n2}{}^a$-$G^a$, wherein $n2^a$ is an integer of 0 to 5, preferably 0; each of $f1^a$ and $f2^a$ is independently an integer of 1 or 2; $R_F{}^a$ is a divalent difluoropolyoxyalkylene chain $R_f$ as defined above and $G^a$ is a hydroxyl-containing group, preferably selected from the group consisting of formulae (g1), (g2) and (g3) as defined above. Preferably, each chain $R_F{}^a$ is independently selected from chains of formula (I) as defined above, more preferably from chains (II-A)-(II-B) as defined above, most preferably from chains of formula (III) as defined above.

Still, according to another further embodiment of the invention, each of the divalent bridging groups E, E', E", E°, E°', E°", E°'", E°"", E°*, E°, E°*, E°**** in formulae (T-1) and (T-2) is independently selected from the group consisting of:
groups of formula —$CF_2(CH_2O)_uCH_2NR_H$— and
groups of formula —$CF_2CF_2(CH_2O)_uCH_2NR_H$—
wherein u is 0 or 1 and each of $R_H$, equal to or different from each other and at each occurrence, is independently a hydrogen atom, a $C_1$-$C_6$ hydrocarbon group or, preferably, a group of formula (chain $R_f$)—$CF_2(CH_2O)_uCH_2$— or of formula (chain $R_f$)—$CF_2CF_2(CH_2O)_uCH_2$—, wherein chain $R_f$ is a fluoropolyoxyalkylene chain as defined above, said chain $R_f$ containing at least one hydroxyl group, and u is as defined above. It is to be understood that in groups —$CF_2(CH_2O)_uCH_2NR_H$— and —$CF_2CF_2(CH_2O)_uCH_2NR_H$— the nitrogen atom will be generally bound to the carbon atom of the triazine ring and the —$CF_2$— group to the fluoropolyoxyalkene chain.

The triazine derivatives according to this third embodiment preferably comply with formulae (T-1c) and (T-2c) herein below:

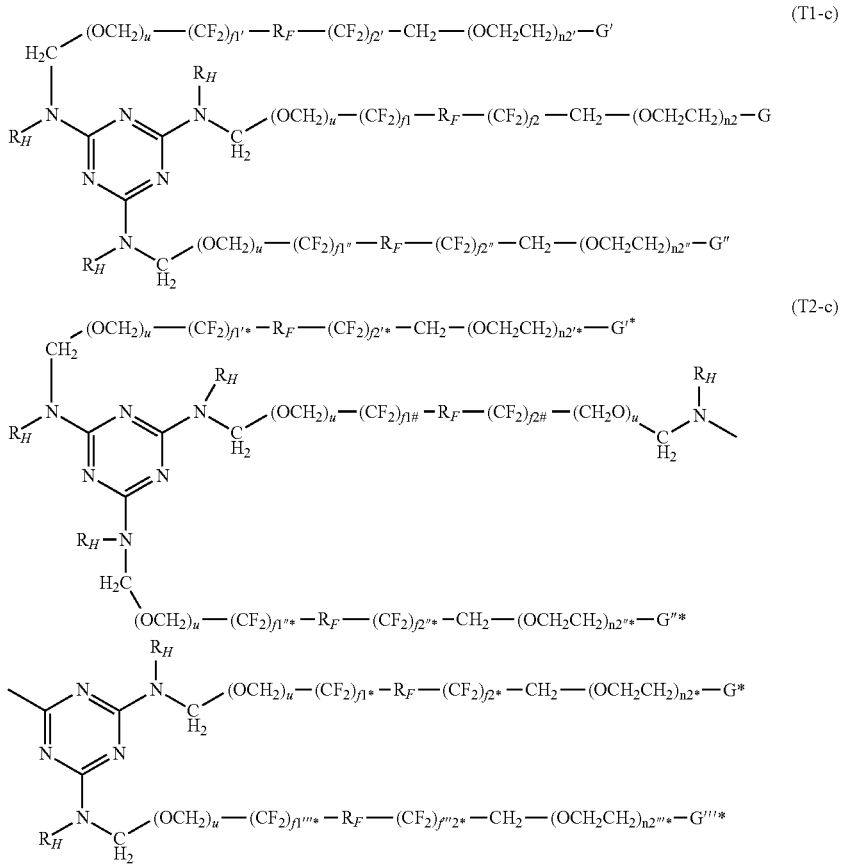

(T1-c)

(T2-c)

wherein:
- each of n2, n2', n2", n2#, n2*, n2'*, n2"*, n2'"*, equal to or different from each other, is independently an integer from 0 to 5, preferably 0;
- each of f1, f2, f1', f2', f1", f2", f1*, f2*, f1'*, f2'*, f1'", f2'"*, f1'"*, f1#, f2#, equal to or different from each other, is independently an integer of 1 to 2;
- u is 0 or 1;
- each of $R_F$, equal to or different from each other and at each occurrence, is independently a divalent fluoropolyoxyalkene chain $R_f$ as above detailed;
- each of $R_H$, equal to or different from each other and at each occurrence, is independently a hydrogen, a $C_1$-$C_6$ hydrocarbon group or, preferably, a group of formula (chain $R_f$)—$CF_2(CH_2O)_uCH_2$— or of formula (chain $R_f$)—$CF_2CF_2(CH_2O)_uCH_2$—, in which chain $R_f$ is a fluoropolyoxyalkylene chain as defined above, said chain $R_f$ containing at least one hydroxyl group;
- each of G, G', G", G*, G'*, G"*, G'"*, equal to or different from each other, is independently a hydroxyl-containing group, preferably selected from the group consisting of formulae (g1), (g2) and (g3) herein below:

—OH (g1)

(g2)

-continued

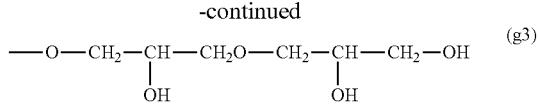

(g3)

preferably a hydroxyl-containing group of formula (g1).

Where in the above triazines (T-1c) and (T-2c) one or more $R_H$ is a group of formula (chain $R_f$)—$CF_2(CH_2O)_uCH_2$— or of formula (chain $R_f$)—$CF_2CF_2(CH_2O)_uCH_2$—, said groups preferably comply with formula —$CH_2(OCH_2)_u(CF_2)_{f1}{}^a$—$R_F{}^a$—$(CF_2)_{f2}{}^a$—$CH_2$—$(OCH_2CH_2)_{n2}{}^a$-$G^2$ wherein n2a is an integer of 0 to 5, preferably 0; each of $f1^a$ and $f2^a$ is independently an integer of 1 or 2; $R_F{}^a$ is a divalent difluoropolyoxyalkylene chain $R_f$ as defined above and $G^a$ is a hydroxyl-containing group, preferably selected from the group consisting of formulae (g1), (g2) and (g3) as defined above. Preferably, each chain $R_F{}^a$ is independently selected from chains of formula (I) as defined above, more preferably from chains (II-A)-(II-B) as defined above, most preferably from chains of formula (III) as defined above.

Further in addition, according to another embodiment of the invention, each of the divalent bridging groups E, E', E", E°, E°', E°", E°"', E°"", E°*, E°, E°*, E°**** in formulae (T-1) and (T-2) is independently selected from the group consisting of:
- groups of formula —$CF_2$— and
- groups of formula —$CF_2CF_2$—.

The triazine derivatives according to this fourth embodiment preferably comply with formulae (T-1d) and (T-2d) herein below:

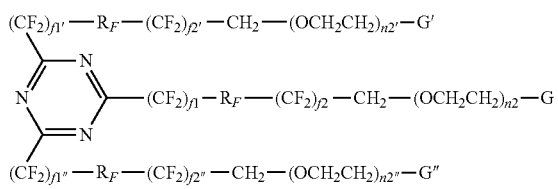
(T1-d)

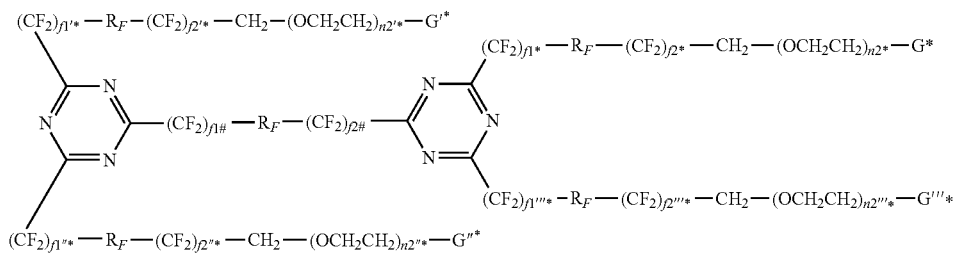
(T-2d)

wherein:
each of n2, n2', n2'', n2#, n2*, n2'*, n2''*, n2'''*, equal to or different from each other, is independently an integer from 0 to 5, preferably 0;
each of f1, f2, f1', f2', f1'', f2'', f1*, f2*, f1'*, f2'*, f1''*, f2''*, f1'''*, f2'''*, f1#, f2#, equal to or different from each other, is independently an integer of 1 to 2;
each of $R_F$, equal to or different from each other and at each occurrence, is independently a divalent fluoropolyoxyalkene chain ($R_f$) as above detailed;
each of G, G', G'', G*, G'*, G''*, G'''*, equal to or different from each other, is independently a hydroxyl-containing group, preferably selected from the group consisting of formulae (g1), (g2) and (g3) herein below:

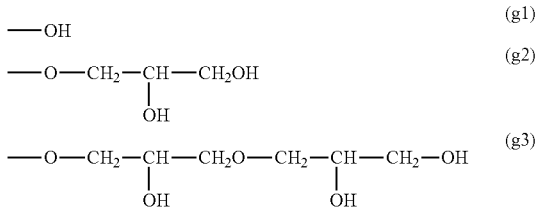

preferably a hydroxyl-containing group of formula (g1).

Methods for the manufacture of the triazine compounds of the invention will be selected by the skilled in the art as a function of actual structure to be synthesized. More particularly, chemistry of the bridging group linking the triazine moiety to the polyoxyalkylene chain will be the result of the precursors and synthetic pathway selected.

Should the triazine compounds of the invention be compounds of formulae (T1-a) and (T2-a) as above detailed, these compounds can be notably manufactured by base-catalyzed condensation reaction between a trihaloderivative of the triazine, typically trichloro-derivative, and a suitable (per)fluoropolyether having a hydroxyl group at one end of the chain and a further hydroxyl-containing group at the other end.

Should the triazine compounds of the invention be compounds of formulae (T1-b) and (T2-b) as above detailed, these compounds can be manufactured by reaction of melamine or melamine derivative with a suitable (per)fluoropolyether having a acyl halide (e.g. acyl fluoride) group at one end of the chain and a hydroxyl-containing group at the other end, generally protected, e.g. under the form of an ester (e.g. acetate) and, if applicable, subsequent deprotection of said protected hydroxyl-containing group.

Should the triazine compounds of the invention be compounds of formulae (T1-c) and (T2-c) as above detailed, these compounds can be manufactured by reaction of melamine or a melamine derivative either with a suitable (per)fluoropolyether having a group activated towards nucleophilic substitution at one end of the chain (e.g. a nonaflate or triflate derivative) and a further hydroxyl-containing group at the other end or via transetherification with a suitable (per)fluoropolyether containing hydroxyl groups. A suitable melamine derivative is, for example, hexamethoxymethylenemelamine (HMMM), which can be reacted, for example, with Fomblin® Z DOL PFPE to provide triazine compounds (T1-c) and (T2-c) in which u is 1, each of n2, n2', n2'', n2#, n2*, n2'*, n2''*, n2'''* is 0, each of f1, f2, f1', f2', f1'', f2'', f1*, f2*, f1'*, f2'*, f1''*, f2''*, f1'''*, f2'''*, f1#, f2#, is 1, each of G, G', G'', G*, G'*, G''*, G'''* is a hydroxyl-containing group of formula (g1) and each of $R_H$ is a group of formula —CH$_2$(OCH$_2$)—(CF$_2$)—$R_F$—(CF$_2$)—CH$_2$—OH.

Should the triazine compounds of the invention be compounds of formulae (T1-d) and (T2-d) as above detailed, these compounds can be manufactured by cyclotrimerization of suitable (per)fluoropolyether derivatives having a nitrile group at one chain end and a hydroxyl-containing group, generally protected, e.g. under the form of an ester (e.g. acetate) and, if applicable, subsequent deprotection of said protected hydroxyl-containing group.

Still another object of the invention is a lubricant composition comprising the triazine derivative of the invention and at least one lubricant.

Preferably, the lubricant composition as above detailed comprises at least one (i.e. one or a mixture of more than one) perfluoropolyether (PFPE) lubricant, i.e. a lubricant comprising a perfluorooxyalkylene chain, that is to say a chain comprising recurring units having at least one ether bond and at least one fluorocarbon moiety, different from the triazine derivative of the invention.

PFPE lubricants can be classified in oils and greases; it is generally understood that oils are compounds having kinematic viscosity (ASTM D445) at 20° C. of from 30 to 30 000 cSt; greases are derived from such oils by addition of suitable thickeners, such as notably polytetrafluoroethylene (PTFE) or inorganic compounds, e.g. talc.

Said PFPE lubricants can optionally comprise functional groups, in particular functional end groups, like notably hydroxyl end groups. Among functional PFPE lubricants which can be used in combination with the triazine derivative of the present invention, mention can be notably made of PFPE commercially available under trade name FOMBLIN® ZDOL and FOMBLIN® Z Tetraol GT from Solvay Solexis SpA.

Should the lubricant composition comprise a non-functional PFPE lubricant, said composition typically comprises a lubricant comprising at least one oil selected from the group consisting of:

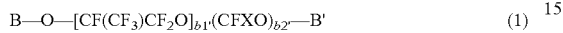   (1)

wherein:
X is equal to —F or —$CF_3$;
B and B', equal to or different from each other, are selected from —$CF_3$, —$C_2F_5$ or —$C_3F_7$;
b1' and b2', equal or different from each other, are independently integers ≥0 selected such that the b1'/b2' ratio is comprised between 20 and 1,000 and b1'+b2' is in the range 5 to 250; should b1' and b2' be both different from zero, the different recurring units are generally statistically distributed along the chain.

$$C_3F_7O—[CF(CF_3)CF_2O]_{o'}-D \quad (2)$$

wherein
D is equal to —$C_2F_5$ or —$C_3F_7$;
o' is an integer from 5 to 250.

wherein
dd' is an integer between 2 and 250.

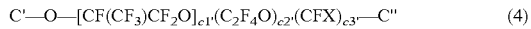   (4)

wherein
X is equal to —F or —$CF_3$;
C' and C", equal to or different from each other, are selected from —$CF_3$, —$C_2F_5$ or —$C_3F_7$;
c1', c2' and c3' equal or different from each other, are independently integers ≥0, such that and c1'+c2'+c3' is in the range 5 to 250; should at least two of c1', c2' and c3' be different from zero, the different recurring units are generally statistically distributed along the chain.

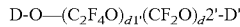

wherein
D and D', equal to or different from each other, are selected from —$CF_3$, —$C_2F_5$ or —$C_3F_7$;
d1 and d2' equal or different from each other, are independently integers ≥0, such that the d1'/d2' ratio is comprised between 0.1 and 5 and d1'+d2' is in the range 5 to 250; should d1' and d2' be both different from zero, the different recurring units are generally statistically distributed along the chain.

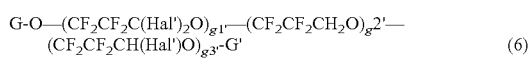   (6)

wherein
G and G', equal to or different from each other, are selected from —$CF_3$, —$C_2F_5$ or —$C_3F_7$;
Hal', equal or different at each occurrence, is a halogen chosen among F and Cl, preferably F;
g1', g2', and g'3 equal or different from each other, are independently integers ≥0, such that g1'+g2'+g3' is in the range 5 to 250; should at least two of g1', g2' and g3' be different from zero, the different recurring units are generally statistically distributed along the chain.

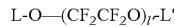   (7)

wherein
L and L', equal to or different from each other, are selected from —$C_2F_5$ or —$C_3F_7$;
l' is an integer in the range 5 to 250.

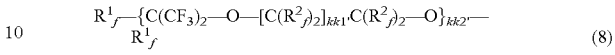   (8)

wherein
$R^1_f$ is a perfluoroalkyl group having from 1 to 6 carbon atoms;
$R^2_f$ is equal to —F or perfluoroalkyl group having from 1 to 6 carbon atoms;
kk1' is an integer from 1 to 2;
kk2' represents a number in the range 5 to 250.

Still another object of the invention is the use of the triazine derivative as above detailed and/or of the lubricant composition as above detailed for lubricating a magnetic recording medium.

Thus, the invention concerns a method for lubricating a magnetic recording medium comprising coating on at least one of its surface a composition comprising the triazine derivative as above detailed.

The magnetic recording medium can be notably a hard disk. In certain embodiments, hard disks comprise advantageously a diamond-like carbon layer onto the magnetically active layer. In this case, the coating as above defined is generally applied onto said diamond like layer.

The invention will be now described in more detail with reference to the following examples whose purpose is merely illustrative and not intended to limit the scope of the present invention.

Should the disclosure of any patents, patent applications, and publications which are herein incorporated by reference be in conflict with the description of the present application to the extent that it may render a term unclear, the present description shall take precedence.

BRIEF DESCRIPTION OF THE DRAWING

FIG. 1 shows the comparison between the thermogravimetric analysis of the compound of example 1, according to the present invention, and the compounds of comparative examples 2-4.

EXAMPLES

Example 1

Synthesis of Triazine Derivative, Comprising Three Hydroxyl Groups

Step 1.1: Reaction of FOMBLIN® ZDOL PFPE with 2,4,6-trichloro-1,3,5-triazine 600 g of FOMBLIN® ZDOL PFPE of formula:

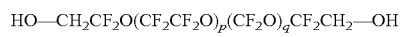

(EW 491 g/eq; Mn~1000; 1.22 eq.; polydispersity index 1.09, p/q=0.98), 200 g of acetonitrile and 3.60 g (58.57 meq) of 2,4,6-trichloro-1,3,5-triazine were charged into a 1 l round-bottomed flask, equipped with a thermometer, a magnetic stirrer, a water cooled condenser and a dropping funnel containing 16.2 g of a 48.15% w/w solution of collidine (trimethylpyridine) in acetonitrile. After cooling at 0° C. on an ice-bath, 5.4 g of this solution was added dropwise. The reaction mixture was maintained at 0° C. under stirring during 2 hours. The temperature was then raised to 20° C. and other amount of the same solution (5.4 g) was added dropwise. The reaction mixture was maintained at 20° C. under stirring during 4 hours. The remaining 5.4 g of solution was added dropwise. The temperature was raised to 80° C. and reaction mixture was maintained at this temperature under stirring during 7 hours (complete conversion). The reaction mixture was then cooled down to room temperature and a crude product was recovered by washing with 5×180 g of distilled water. The solvent was removed by distillation at reduced pressure to afford 599.39 g of crude product which is a mixture of unreacted FOMBLIN® ZDOL PFPE, desired product and its oligomers, i.e. its dimeric form having the following formula:

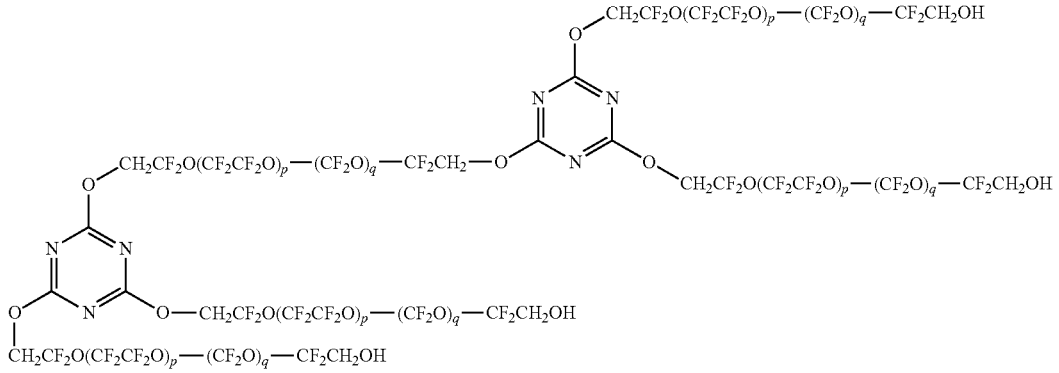

with p and q having the meanings as above detailed.

Step 1.2a: Removal of Unreacted FOMBLIN® ZDOL PFPE

Most of unreacted FOMBLIN® ZDOL PFPE was removed in three passages through molecular distillation under a residual pressure of $3 \times 10^{-3}$ mbar at 100° C., 105° C. and 107° C., respectively. The feed flow rate was set at about 100 g/h in all cases. Three low-viscous fractions (49.9, 24.9 and 10.7% by weight, respectively) of only FOMBLIN® ZDOL PFPE (confirmed through $^{19}$F-NMR analysis) were therefore removed, leaving a high boiling, low volatility residue, which was characterized by $^{19}$F-NMR.

Step 1.2b: scCO$_2$ Fractionation

As an alternative to the molecular distillation technique above detailed, the crude residue was charged into a 300 ml SFT-150 Supercritical CO$_2$ Extraction System and heated at 100° C. Through a step-by-step increase of pressure (from 150 to 300 bar) the triazine derivative bearing three hydroxyl groups and complying with following formula:

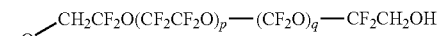

with p and q having the meanings as above detailed, was successfully isolated. The unreacted residual FOMBLIN® ZDOL PFPE was easily removed at scCO$_2$ low pressure, while certain high MW by-product oligomers were selectively collected at high pressure.

Comparative Example 1

Reaction of Monofunctional Alcohol with Trichlorotriazine 294.58 g of monofunctional alcohol PFPE having formula: $HOCH_2CF_2O(CF_2CF_2O)_p(CF_2O)_qCF_3$ (p/q=1; p and q were selected so as to obtain Mn 1000, EW 1030 g/eq.; 286 meq.), 148 g of acetonitrile, 600 g of hexafluoroxylene (HFX), 56.32 g of potassium carbonate (407.55 meq.) and 16.70 g (271.70 meq.) of 2,4,6-trichloro-1,3,5-triazine were charged into a 1 l round-bottomed flask, equipped with a thermometer, a magnetic stirrer and a water cooled condenser. The temperature was slowly raised to 80° C. and reaction mixture was maintained at this temperature under stirring during 16 hours (98% conversion by $^{19}$F-NMR). After cooling down to room temperature and adding 590 g of demineralized water, HCl 37% was added dropwise until acid pH was reached. The organic phase was separated and washed three times with a 5% w/w hydroalcoholic solution of isobutanol. Solvents and unreacted monofunctional alcohol were removed by distillation at 100° C. and reduced pressure ($10^{-2}$ mbar) to afford 272.48 g of crude product of formula:

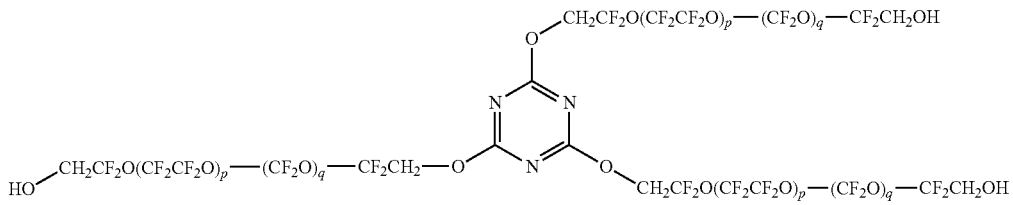

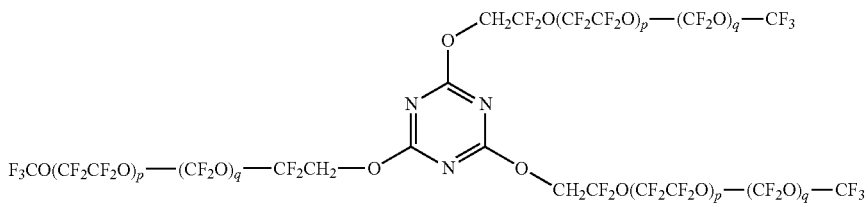

as confirmed by $^{19}$F-NMR, $^{13}$C-NMR and FTIR analysis. Final product was filtered through a 0.2 μm PTFE membrane.

TGA Analyses on Neat Samples or on Silica Adsorbed Samples

The thermogravimetric analysis (TGA) were performed in an air atmosphere with a Perkin Elmer TGA 7 instrument in the temperature range 25-800° C. with a heating rate 10° C./min either on neat samples or on samples adsorbed on silica gel.

Results from silica-adsorbed specimens were used for characterizing thermo-oxidative stability cleaned from the contribution of volatility; while neat sample TGAs compared to the TGA of adsorbed specimens, make possible to clarify the contribution of the volatility to the total weight loss. Samples adsorbed onto silica were prepared as follow: 1 g of silica gel, 0.5 g of triazine derivative and 10 g of A113 were charged into a round-bottomed flask, equipped with a magnetic stirrer. The reaction mixture was maintained at room temperature under stirring during 8 hours before removing solvent by distillation under reduced pressure.

To the sake of comparison with inventive compound of example 1, following PFPE derivatives were tested in analogous conditions:
- the PFPE triazine derivative of comparative example 2, free from hydroxyl groups (Comp. Ex. 2);
- a commercially available diol derivative, namely FOMBLIN® ZDOL having Mn~3000 (Comp. Ex. 3); and
- a commercially available tetraol derivative, namely FOMBLIN® Z Tetraol 3200GT, having Mn~3000 (Comp. Ex. 4).

So obtained TGA traces for silica-adsorbed samples are depicted in FIG. 1.

After an initial plateau region in the TGA traces with the only exception of the product without —OH end-groups which shows a continuous decrease of weight due to its higher volatility, a sudden drop in the mass, due to thermo-oxidative degradation, was in all cases observed. Results showed that the triazine derivative of the invention (Ex. 1), comprising three hydroxyl groups, has a higher thermo-oxidative stability compared to other derivatives.

Specifically the temperatures at which a degradation corresponding to a weight loss of 10% (for both neat and silica adsorbed specimens) and at 50% (for silica adsorbed specimens) were identified for investigated compounds and are summarized in the following Tables 1 and 2, the higher the temperature values, the better the behaviour, both in terms of interaction with the support and thermo-oxidative stability. In particular, Table 1 summarizes differences in temperatures at which 10% weight loss is recorded among silica adsorbed and neat samples: this parameter is considered to represent a good indication of the ability of the lubricant derivative to interact with the substrate and then depressing negative volatility phenomena. Values in Table 1, recorded for compounds substantially having similar Mn, show higher ΔT, thus major interaction with the substrate, for hydroxyl-containing triazine with respect to corresponding hydroxyl-free neutral triazine derivative of comparative example 2.

TABLE 1

| Sample i.d. | Ex. 1 | Comp. Ex. 2 | Comp. Ex. 3 | Comp. Ex. 4 |
|---|---|---|---|---|
| ΔT* (for 10% wt loss) | 81° C. | 37° C. | 84° C. | 52° C. |

*ΔT: difference in temperatures at which 10% weight loss occur between silica adsorbed and neat specimens.

TABLE 2

| Sample i.d. | Ex. 1 | Comp. Ex. 2 | Comp. Ex. 3 | Comp. Ex. 4 |
|---|---|---|---|---|
| T** for 50% wt loss | 410° C. | 382° C. | 379° C. | 379° C. |

**for silica adsorbed specimens.

Data provided in Table 2 nicely demonstrate that thermo-oxidative behaviour of the inventive compound largely exceeds that of all other comparative materials (see Table 2), including triazine-containing but without —OH end-groups (comparative example 2) and triazine-free (comparative example 3 and 4 related to conventional hydroxyl-containing lubricants) perfluoropolyether derivatives.

The invention claimed is:

1. A triazine derivative of formula (T-1) or formula (T-2):

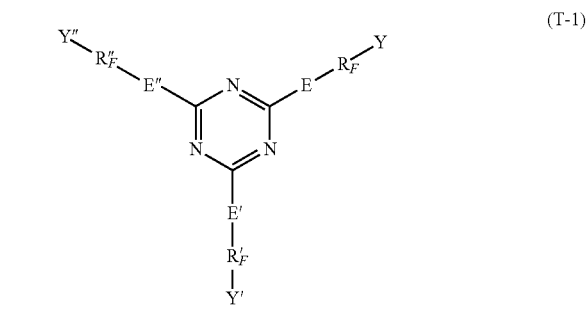

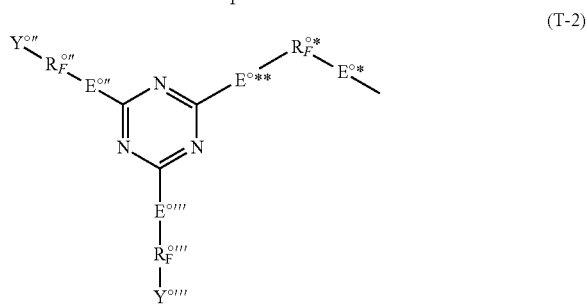

-continued

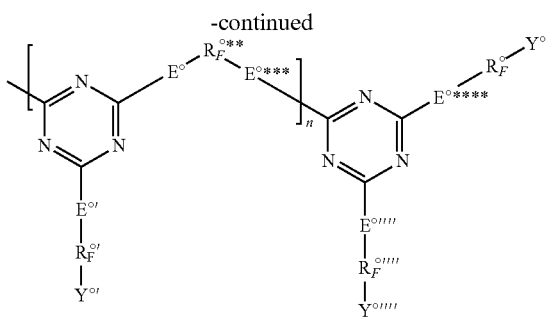

wherein:

each of Y, Y', Y", Y°, Y°', Y°", Y°''', Y°'''' equal to or different from each other, is independently a hydrocarbon group, optionally fluorinated, wherein at least one of Y, Y', Y" in formula (T-1) and at least one of Y°, Y°', Y°", Y°''', Y°'''' in formula (T-2) is selected from the group consisting of:

groups of formula —$CF_2CH_2O(CH_2CH_2O)_{s'}H$ and —$CF_2CF_2CH_2O(CH_2CH_2O)_{s''}H$, wherein s' and s", equal to or different from each other and at each occurrence, are integers from 0 to 5; and groups of formula —$CF_2CH_2O(CH_2CH_2O)_{w'}J'(OH)_{e'}$ and —$F_2CF_2CH_2O(CH_2CH_2O)_{w''}J''(OH)_{e''}$, wherein w' and w", equal to or different from each other and at each occurrence, are integers from 0 to 5, J' and J" are $C_1$-$C_{12}$ hydrocarbon bridging group, optionally comprising ethereal bonds; and e' and e" are integers from 2 to 4;

each of $R_F$, $R'_F$, $R''_F$, $R°_F$, $R°'_F$, $R°''_F$, $R°'''_F$, $R°''''_F$, $R°*_F$, $R°**_F$, equal to or different from each other, is independently a divalent fluoropolyoxyalkene chain ($R_f$) comprising repeating units R°, said repeating units selected from the group consisting of:

(i) —CFXO—, wherein X is F or $CF_3$,
(ii) —CFXCFXO—, wherein X, equal to or different at each occurrence, is F or $CF_3$, wherein at least one of X is —F,
(iii) —$CF_2CF_2CW_2O$—, wherein each of W, equal to or different from each other, are selected from F, Cl, and H,
(iv) —$CF_2CF_2CF_2CF_2O$—, and
(v) —$(CF_2)_j$—CFZ—O—wherein j is an integer from 0 to 3 and Z is a group of general formula —$OR_f'T_3$, wherein $R_f'$ is a fluoropolyoxyalkene chain comprising between 0 and 10 repeating units each independently selected from the group consisting of —CFXO—, —$CF_2CFXO$—, —$CF_2CF_2CF_2O$—, and —$CF_2CF_2CF_2CF_2O$—, with each of X being independently F or $CF_3$, and wherein $T_3$ is a $C_1$—$C_3$ perfluoroalkyl group;

each of E, E', E", E°, E°', E°", E°''', E°'''', E°*, E°, E°*, E°****, equal to or different from each other, is independently a bond or a $C_1$-$C_{20}$ divalent bridging group, optionally comprising heteroatoms, optionally fluorinated, optionally further comprising one or more than one hydroxyl group; and n in formula (T-2) is zero or an integer from 1 to 5.

2. The triazine derivative of claim 1, wherein said at least one of Y, Y', Y" in formula (T-1) and said at least one of Y°, Y°', Y°", Y°''', Y°'''' in formula (T-2) is selected from the group consisting of:

groups of formula —$CF_2CH_2OH$ and $CF_2CF_2CH_2OH$; and groups of formula —$CF_2CH_2O(CH_2CHOHCH_2O)_{d'}H$ and —$CF_2CF_2CH_2O(CH_2CHOHCH_2O)_{d''}H$, wherein d' and d", equal to or different from each other and at each occurrence, are integers from 1 to 3.

3. The triazine derivative of claim 2, complying with any of formula (T-1a) and (T-2a) herein below:

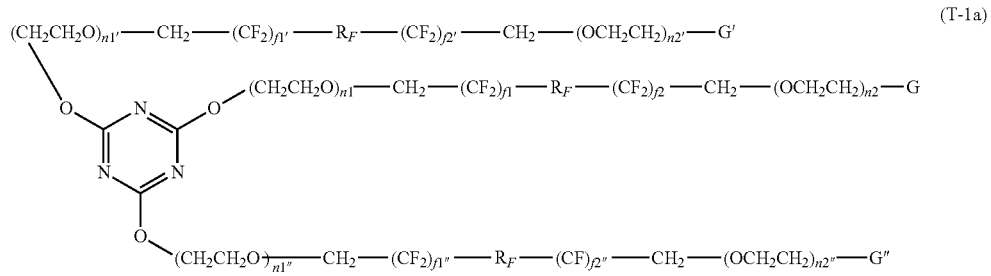

(T-1a)

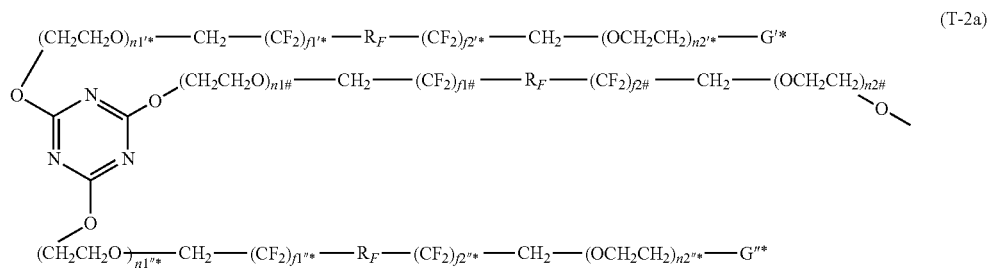

(T-2a)

-continued

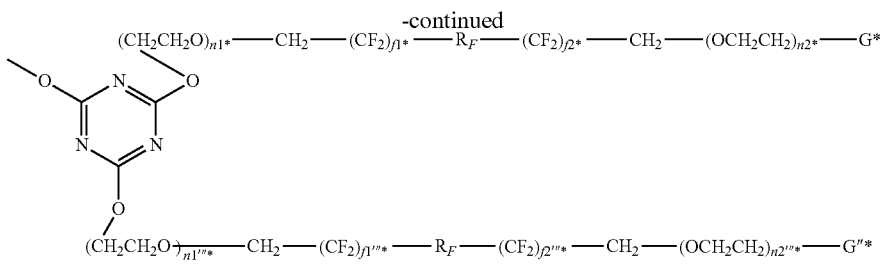

wherein:
each of n1, n2, n1', n2', n1", n2", n1#, n2#, n1*, n2*, n1'*, n2'*, n1"*, n2"*, n1'"*, n2'"*, equal to or different from each other, is independently an integer from 0 to 5 each of f1, f2, f1', f2', f1", f2", f1*, f2*, f1'*, f2'*, f1"*, f2"*, f1'"*, f2'"*, f1#, f2#, equal to or different from each other, is independently an integer of 1 to 2;

each of $R_F$, equal to or different from each other and at each occurrence, is independently a divalent fluoropolyoxyalkene chain ($R_f$); and each of G, G', G", G*, G'*, G"*, G'"*, equal to or different from each other, is independently a hydroxyl-containing group, wherein said $R_f$ is a chain comprising repeating units R°, said repeating units selected from the group consisting of:

—CFXO—, (i)

wherein X is F or $CF_3$,

—CFXCFXO—, (ii)

wherein X, equal to or different at each occurrence, is F or $CF_3$, wherein at least one of X is —F, —$CF_2CF_2CW_2O$—, (iii)

wherein each of W, equal to or different from each other, are F, Cl, and H,

—$CF_2CF_2CF_2CF_2O$—, (iv)

and

—$(CF_2)_j$—CFZ—O—, (v)

wherein j is an integer from 0 to 3 and Z is a group of general formula —$OR_f'T_3$, wherein $R_f'$ is a fluoropolyoxyalkene chain comprising between 0 and 10 repeating units each independently selected from the group consisting of —CFXO—, —$CF_2CFXO$—, —$CF_2CF_2CF_2O$—, and —$CF_2CF_2CF_2CF_2O$—, with each of X being independently F or $CF_3$, and wherein $T_3$ is a $C_1$-$C_3$ perfluoroalkyl group.

4. The triazine derivative of claim 2, complying with any of formula (T-1b) and (T-2b) herein below:

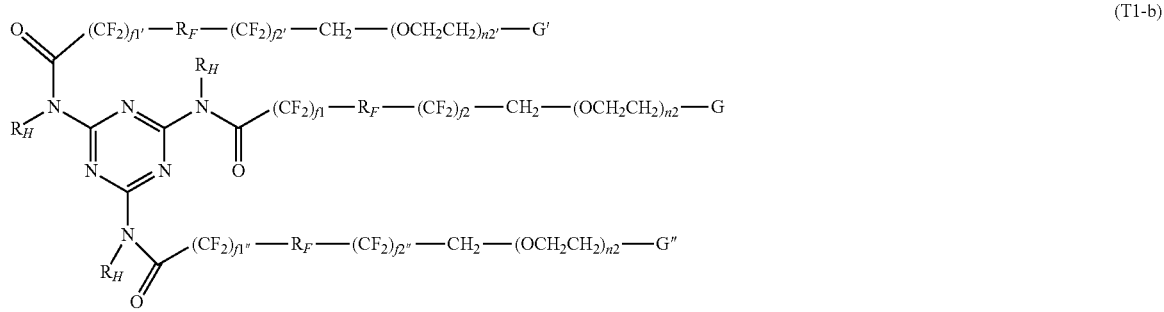

(T-1b)

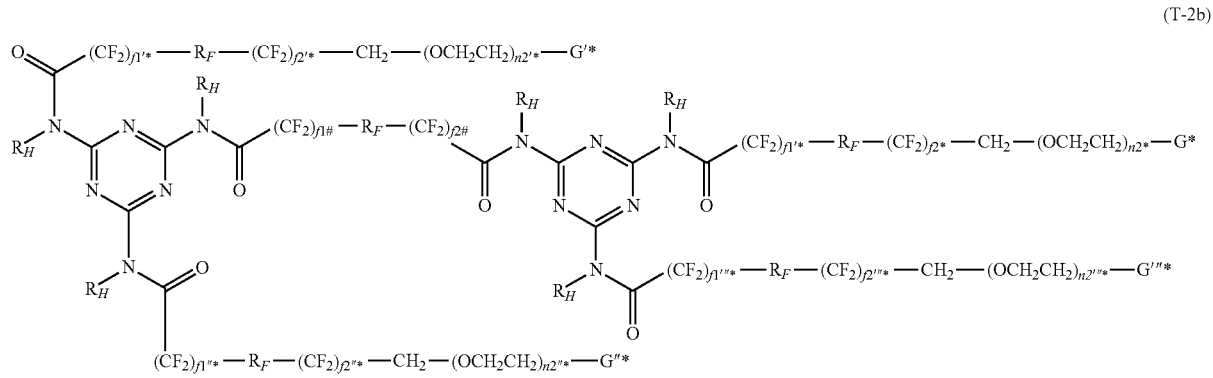

(T-2b)

wherein:
- each of n2, n2', n2", n2#, n2*, n2'*, n2"*, n2"'*, equal to or different from each other, is independently an integer from 0 to 5;
- each of f1, f2, f1', f2', f1", f2", f1*, f2*, f1'*, f2'*, f1"*, f2"*, f1"'*, f2"'*, f1#, f2#, equal to or different from each other, is independently an integer of 1 to 2;
- each of $R_F$, equal to or different from each other and at each occurrence, is independently a divalent fluoropolyoxyalkene chain ($R_f$);
- each of $R_H$, equal to or different from each other and at each occurrence, is independently a hydrogen atom, a $C_1$-$C_6$ alkyl group or a (chain $R_f$)—C(O)— group, in which chain ($R_f$) is a fluoropolyoxyalkylene chain containing at least one hydroxyl group; and
- each of G, G', G", G*, G'*, G"*, G"'*, equal to or different from each other, is independently a hydroxyl-containing group, wherein said $R_f$ is a chain comprising repeating units R°, said repeating units selected from the group consisting of:

—CFXO—, (i)

wherein X is F or $CF_3$,

—CFXCFXO—, (ii)

wherein X, equal to or different at each occurrence, is F or $CF_3$, wherein at least one of X is —F, —$CF_2CF_2CW_2O$—, (iii)

wherein each of W, equal to or different from each other, are F, Cl, and H,

—$CF_2CF_2CF_2CF_2O$—, (iv)

and

—$(CF_2)_j$—CFZ—O—, (v)

wherein j is an integer from 0 to 3 and Z is a group of general formula —$OR_f'T_3$, wherein $R_f'$ is a fluoropolyoxyalkene chain comprising between 0 and 10 repeating units each independently selected from the group consisting of —CFXO—, —$CF_2CFXO$—, —$CF_2CF_2CF_2O$—, and —$CF_2CF_2CF_2CF_2O$—, with each of X being independently F or $CF_3$, and wherein $T_3$ is a $C_1$-$C_3$ perfluoroalkyl group.

5. The triazine derivative of claim 4 wherein each of $R_H$, equal to or different from each other and at each occurrence, is independently a group complying with formula —CO—$(CF_2)_{f1}{}^a$—$R_F{}^a$—$(CF_2)_{f2}{}^a$—$CH_2$—$(OCH_2CH_2)_{n2}{}^a$-$G^a$, wherein $n2^a$ is an integer of 0 to 50; each of $f1^a$ and $f2^a$ is independently an integer of 1 or 2; $R_F{}^a$ is a divalent difluoropolyoxyalkylene chain ($R_f$) and $G^a$ is a hydroxyl-containing group, wherein said $R_f$ is a chain comprising repeating units R°, said repeating units is selected from the group consisting of:

—CFXO—, (i)

wherein X is F or $CF_3$,

—CFXCFXO—, (ii)

wherein X, equal to or different at each occurrence, is F or $CF_3$, wherein at least one of X is —F, —$CF_2CF_2CW_2O$—, (iii)

wherein each of W, equal to or different from each other, are F, Cl, and H,

—$CF_2CF_2CF_2CF_2O$—, (iv)

and

—$(CF_2)_j$—CFZ—O—, (v)

wherein j is an integer from 0 to 3 and Z is a group of general formula —$OR_f'T_3$, wherein $R_f'$ is a fluoropolyoxyalkene chain comprising between 0 and 10 repeating units each independently selected from the group consisting of —CFXO—, —$CF_2CFXO$—, —$CF_2CF_2CF_2O$—, and —$CF_2CF_2CF_2CF_2O$—, with each of X being independently F or $CF_3$, and wherein $T_3$ is a $C_1$-$C_3$ perfluoroalkyl group.

6. The triazine derivative of claim 2 complying with any of formula (T-1c) and (T-2c) herein below:

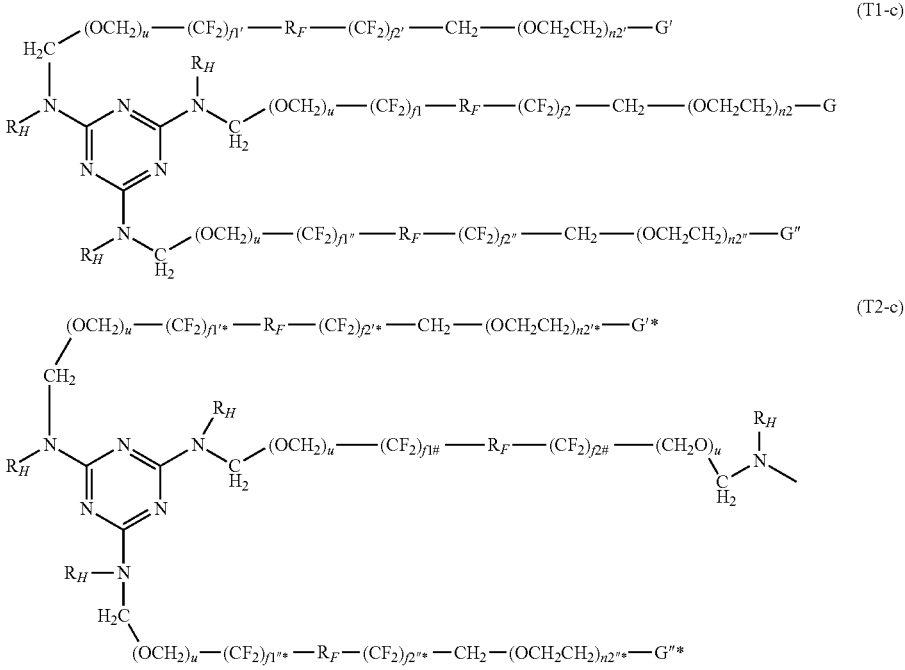

-continued

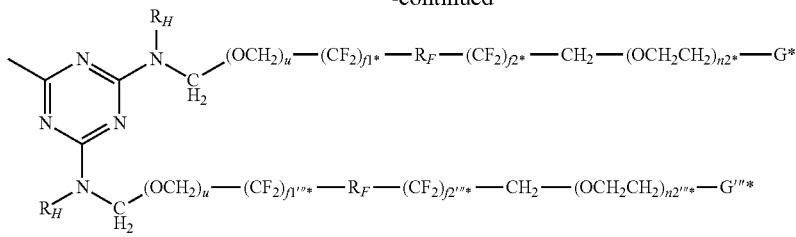

wherein:
each of n2, n2', n2", n2#, n2*, n2'*, n2"*, n2'"*, equal to or different from each other, is independently an integer from 0 to 5;
each of f1, f2, f1', f2', f1", f2", f1*, f2*, f1'*, f2'*, f1"*, f2"*, f1'"*, f2'"*, f1#, f2#, equal to or different from each other, is independently an integer of 1 to 2;
u is 0 or 1;
each of $R_F$, equal to or different from each other and at each occurrence, is independently a divalent fluoropolyoxyalkene chain ($R_f$);
each of $R_H$, equal to or different from each other and at each occurrence, is independently a hydrogen atom, a $C_1$-$C_6$ alkyl group or a group of formula (chain $R_f$)—$CF_2(CH_2O)_uCH_2$— or of formula (chain $R_f$)—$CF_2CF_2(CH_2O)_uCH_2$—, wherein said chain $R_f$ is a fluoropolyoxyalkylene chain containing at least one hydroxyl group;
each of G, G', G", G*, G'*, G"*, G'"*, equal to or different from each other, is independently a hydroxyl-containing group,
wherein said $R_f$ is a chain comprising repeating units R°, said repeating units selected from the group consisting of:

—CFXO—, (i)

wherein X is F or $CF_3$,

—CFXCFXO—, (ii)

wherein X, equal to or different at each occurrence, is F or $CF_3$, wherein at least one of X is —F, —$CF_2CF_2CW_2O$—, (iii)

wherein each of W, equal to or different from each other, are F, Cl, and H,

—$CF_2CF_2CF_2CF_2O$—, (iv)

and

—$(CF_2)_j$—CFZ—O—, (v)

wherein j is an integer from 0 to 3 and Z is a group of general formula —$OR_f'T_3$, wherein $R_f'$ is a fluoropolyoxyalkene chain comprising between 0 and 10 repeating units each independently selected from the group consisting of —CFXO—, —$CF_2CFXO$—, —$CF_2CF_2CF_2O$—, and —$CF_2CF_2CF_2CF_2O$—, with each of X being independently F or $CF_3$, and wherein $T_3$ is a $C_1$-$C_3$ perfluoroalkyl group.

7. The triazine derivative of claim 6 wherein each of $R_H$, equal to or different from each other and at each occurrence, is a group of formula —$CH_2$—$(OCH_2)_u$—$(CF_2)_{f1}{}^a$—$R_F{}^a$—$(CF_2)_{f2}{}^a$—$CH_2$—$(OCH_2CH_2)_{n2}{}^a$-$G^a$, wherein u is 0 or 1, $n2^a$ is an integer of 0 to; each of $f1^a$ and $f2^a$ is independently an integer of 1 or 2; $R_F{}^a$ is a divalent fluoropolyoxyalkylene chain ($R_f$) and $G^a$ is a hydroxyl-containing group,
wherein said $R_f$ is a chain comprising repeating units R°, said repeating units selected from the group consisting of:

—CFXO—, (i)

wherein X is F or $CF_3$,

—CFXCFXO—, (ii)

wherein X, equal to or different at each occurrence, is F or $CF_3$, wherein at least one of X is —F, —$CF_2CF_2CW_2O$—, (iii)

wherein each of W, equal to or different from each other, are F, Cl, and H,

—$CF_2CF_2CF_2CF_2O$—, (iv)

and

—$(CF_2)_j$—CFZ—O—, (v)

wherein j is an integer from 0 to 3 and Z is a group of general formula —$OR_f'T_3$, wherein $R_f'$ is a fluoropolyoxyalkene chain comprising between 0 and 10 repeating units each independently selected from the group consisting of —CFXO—, —$CF_2CFXO$—, —$CF_2CF_2CF_2O$—, and —$CF_2CF_2CF_2CF_2O$—, with each of X being independently F or $CF_3$, and wherein $T_3$ is a $C_1$-$C_3$ perfluoroalkyl group.

8. The triazine derivative of claim 2, complying with any of formula (T-1d) and (T-2d) herein below:

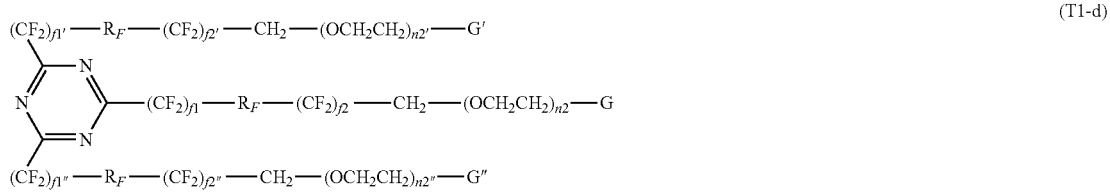

(T1-d)

$$(CF_2)_{f1'*}-R_F-(CF_2)_{f2'*}-CH_2-(OCH_2CH_2)_{n2'*}-G'* \quad (CF_2)_{f1*}-R_F-(CF_2)_{f2*}-CH_2-(OCH_2CH_2)_{n2*}-G*$$

$$\text{(T-2d)}$$

[Triazine structure with two triazine rings connected by $-(CF_2)_{f1\#}-R_F-(CF_2)_{f2\#}-$ linker]

$$(CF_2)_{f1''*}-R_F-(CF_2)_{f2''*}-CH_2-(OCH_2CH_2)_{n2''*}-G''* \quad (CF_2)_{f1'''*}-R_F-(CF_2)_{f2'''*}-CH_2-(OCH_2CH_2)_{n2'''*}-G'''*$$

wherein:
- each of n2, n2', n2", n2#, n2*, n2'*, n2"*, n2'"*, equal to or different from each other, is independently an integer from 0 to 5;
- each of f1, f2, f1', f2', f1", f2", f1*, f2*, f1'*, f2'*, f1"*, f2"*, f1'"*, f2'"*, f1#, f2#, equal to or different from each other, is independently an integer of 1 to 2;
- each of $R_F$, equal to or different from each other and at each occurrence, is independently a divalent fluoropolyoxyalkene chain ($R_f$); and
- each of G, G', G", G*, G'*, G"*, G'"*, equal to or different from each other, is independently a hydroxyl-containing group,
  wherein said $R_f$ is a chain comprising repeating units R°, said repeating units is selected from the group consisting of:

$$-CFXO-, \quad \text{(i)}$$

wherein X is F or $CF_3$, $$-CFXCFXO-, \quad \text{(ii)}$$

wherein X, equal to or different at each occurrence, is F or $CF_3$, wherein at least one of X is —F, $$-CF_2CF_2CW_2O-, \quad \text{(iii)}$$

wherein each of W, equal to or different from each other, are F, Cl, and H, $$-CF_2CF_2CF_2CF_2O-, \quad \text{(iv)}$$

and $$-(CF_2)_j-CFZ-O-, \quad \text{(v)}$$

wherein j is an integer from 0 to 3 and Z is a group of general formula $-OR_f'T_3$, wherein $R_f'$ is a fluoropolyoxyalkene chain comprising between 0 and 10 repeating units each independently selected from the group consisting of —CFXO—, —$CF_2CFXO-$, —$CF_2CF_2CF_2O-$, and —$CF_2CF_2CF_2CF_2O-$, with each of X being independently F or $CF_3$, and wherein $T_3$ is a $C_1$-$C_3$ perfluoroalkyl group.

9. A lubricant composition comprising a triazine derivative and at least one lubricant, wherein the triazine derivative comprises at least one triazine group and at least one fluoropolyoxyalkene chain (chain Rf) comprising a fluorocarbon segment having ether linkages in the main chain, wherein chain Rf comprises at least one hydroxyl group.

10. The lubricant composition of claim 9 comprising at least one perfluoropolyether (PFPE) lubricant comprising a perfluorooxyalkylene chain, wherein said chain comprises recurring units having at least one ether bond and at least one fluorocarbon moiety, different from said triazine derivative.

11. A method for lubricating a magnetic recording medium comprising coating on at least one of its surface a composition comprising a triazine derivative, wherein the triazine derivative comprises at least one triazine group and at least one fluoropolyoxyalkene chain (chain Rf) comprising a fluorocarbon segment having ether linkages in the main chain, wherein chain Rf comprises at least one hydroxyl group.

12. The method of claim 11, wherein the magnetic recording medium is a hard disk.

13. The triazine derivative of claim 3, wherein each of G, G', G", G*, G'*, G"*, G'"*, equal to or different from each other, is independently a hydroxyl-containing group selected from the group consisting of formula (g1), (g2) and (g3):

$$-OH \quad \text{(g1)}$$

$$-O-CH_2-\underset{\underset{OH}{|}}{CH}-CH_2OH \quad \text{(g2)}$$

$$-O-CH_2-\underset{\underset{OH}{|}}{CH}-CH_2O-CH_2-\underset{\underset{OH}{|}}{CH}-CH_2-OH. \quad \text{(g3)}$$

14. The triazine derivative of claim 4, wherein each of G, G', G", G*, G'*, G"*, G'"*, equal to or different from each other, is independently a hydroxyl-containing group selected from the group consisting of formula (g1), (g2) and (g3):

$$-OH \quad \text{(g1)}$$

$$-O-CH_2-\underset{\underset{OH}{|}}{CH}-CH_2OH \quad \text{(g2)}$$

$$-O-CH_2-\underset{\underset{OH}{|}}{CH}-CH_2O-CH_2-\underset{\underset{OH}{|}}{CH}-CH_2-OH. \quad \text{(g3)}$$

15. The triazine derivative of claim 6, wherein each of G, G', G", G*, G'*, G"*, G'"*, equal to or different from each other, is independently a hydroxyl-containing group selected from the group consisting of formula (g1), (g2) and (g3):

$$-OH \quad \text{(g1)}$$

$$-O-CH_2-\underset{\underset{OH}{|}}{CH}-CH_2OH \quad \text{(g2)}$$

$$-O-CH_2-\underset{\underset{OH}{|}}{CH}-CH_2O-CH_2-\underset{\underset{OH}{|}}{CH}-CH_2-OH. \quad \text{(g3)}$$

16. The triazine derivative of claim 8, wherein each of G, G', G", G*, G'*, G"*, G'"*, equal to or different from each other, is independently a hydroxyl-containing group selected from the group consisting of formula (g1), (g2) and (g3):

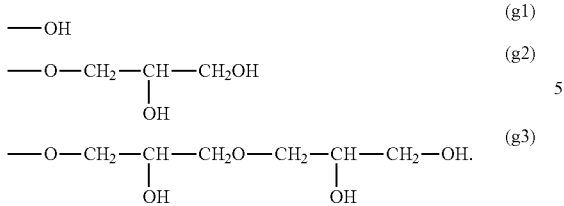
17. The triazine derivative of claim 5, wherein $G^a$ is a hydroxyl-containing group selected from the group consisting of formula (g1), (g2) and (g3):
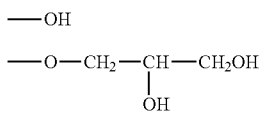
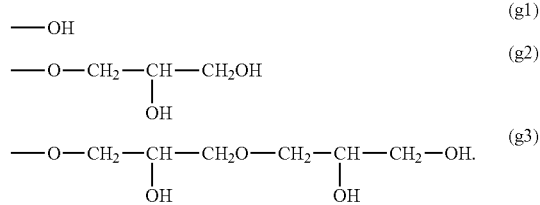
18. The triazine derivative of claim 10, wherein $G^a$ is a hydroxyl-containing group selected from the group consisting of formula (g1), (g2) and (g3):
(g1) —OH
(g2) —O—CH$_2$—CH(OH)—CH$_2$OH
(g3) —O—CH$_2$—CH(OH)—CH$_2$O—CH$_2$—CH(OH)—CH$_2$—OH.
* * * * *